US006286183B1

(12) United States Patent
Stickel et al.

(10) Patent No.: US 6,286,183 B1
(45) Date of Patent: Sep. 11, 2001

(54) CASTER WITH SECURING DEVICE

(75) Inventors: Uwe Stickel, Langenfeld; Siegfried Engels, Wermelskirchen, both of (DE)

(73) Assignee: Tente-Rollen GmbH & Co., Wermelskirchen (DE)

( * ) Notice: Subject to any disclaimer, the term of this patent is extended or adjusted under 35 U.S.C. 154(b) by 0 days.

(21) Appl. No.: 09/142,447

(22) PCT Filed: Jun. 21, 1997

(86) PCT No.: PCT/EP97/03267

§ 371 Date: Jul. 16, 1999

§ 102(e) Date: Jul. 16, 1999

(87) PCT Pub. No.: WO98/03355

PCT Pub. Date: Jan. 29, 1998

(30) Foreign Application Priority Data

Jul. 19, 1996 (DE) .......................................... 296 12 551 U

(51) Int. Cl.⁷ .................................................. B60D 33/00
(52) U.S. Cl. ............................ 16/35 R; 16/30; 177/144
(58) Field of Search .............................. 16/35 R, 47, 45, 16/44, 20, 48, 23, 30; 177/144

(56) References Cited

U.S. PATENT DOCUMENTS

| 3,409,105 | | 11/1968 | Clinton . | |
|---|---|---|---|---|
| 4,103,391 | * | 8/1978 | Thomsen | 16/33 |
| 4,677,706 | | 7/1987 | Screen . | |
| 4,854,008 | * | 8/1989 | Kuo | 16/30 |
| 4,969,372 | * | 11/1990 | Muhlecker | 74/501.5 R |
| 4,998,320 | * | 3/1991 | Lange | 16/35 R |
| 5,119,689 | * | 6/1992 | Adams | 74/502.5 |
| 5,133,106 | * | 7/1992 | Milbredt | 16/35 R |
| 5,139,116 | * | 8/1992 | Screen | 188/1.12 |
| 5,343,988 | * | 9/1994 | Bartsch | 190/18 A |
| 5,823,278 | * | 10/1998 | Geringer | 177/144 |

FOREIGN PATENT DOCUMENTS

| 1505788 | 6/1969 | (DE) . |
|---|---|---|
| 4427320 | 2/1996 | (DE) . |
| 1172072 | 11/1969 | (GB) . |

* cited by examiner

Primary Examiner—Anthony Knight
Assistant Examiner—Mark Williams
(74) Attorney, Agent, or Firm—Martin A. Farber

(57) ABSTRACT

A caster, in particular for movable hospital beds, laboratory tables and the like, with a securing device which is connected to a handle via a Bowden cable. A locking piece (16) is movable between a locking and an unlocking position by Bowden cable (12), that, in the locking position, the locking piece (16), being located between pairs of stop faces (21, 22; 19, 19', 20, 20') which are fixed relative to a rotary part (6) and are fixed on the rotary part and which are designed in relation to an axis of rotation (2), blocks rotational movement about the axis of rotation (2), and that, in the unlocking position, the locking piece (16) releases at least identically fixed pairs of the stop faces (21, 22) for rotational movement of the rotary part (6).

15 Claims, 4 Drawing Sheets

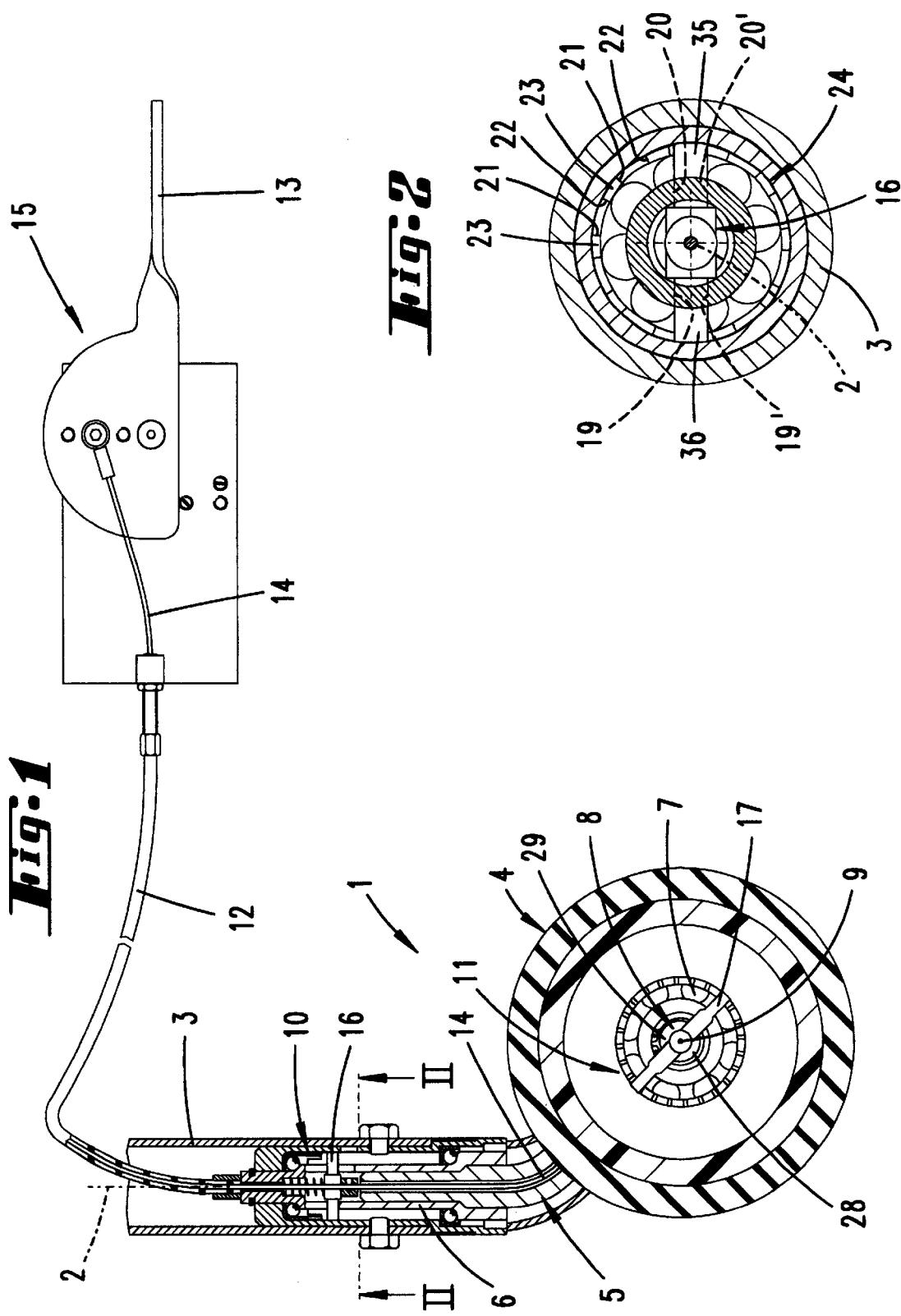

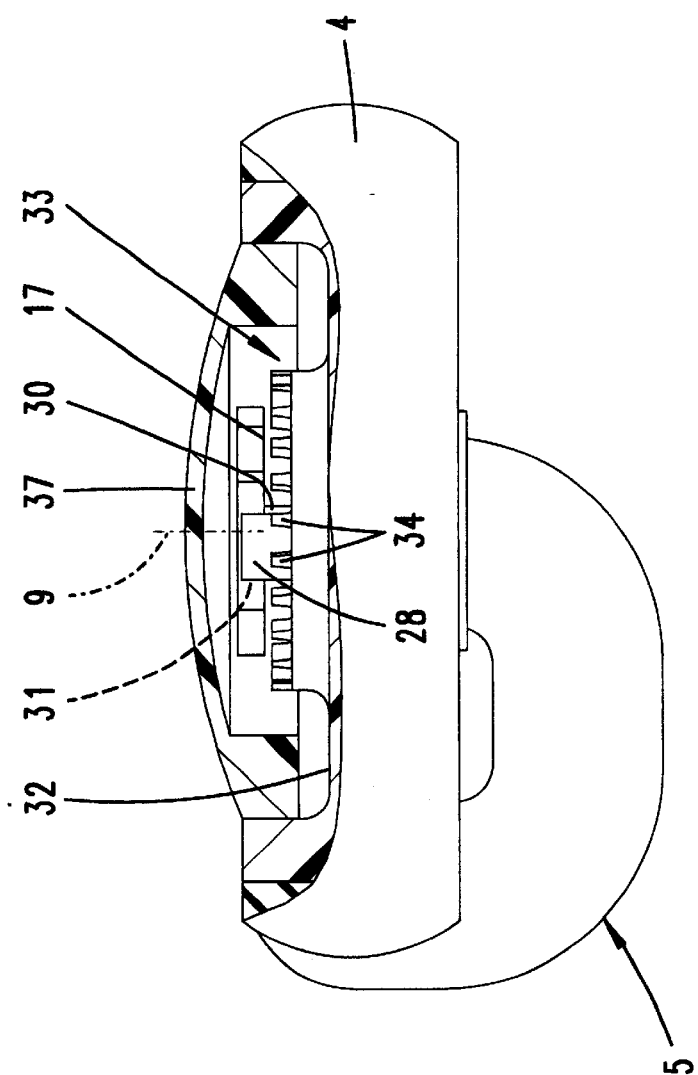
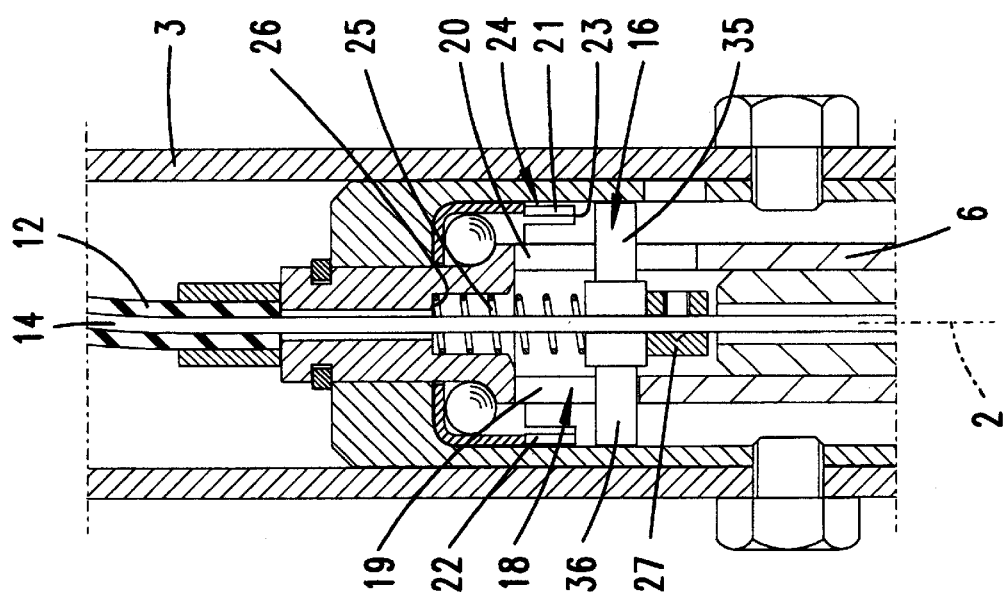

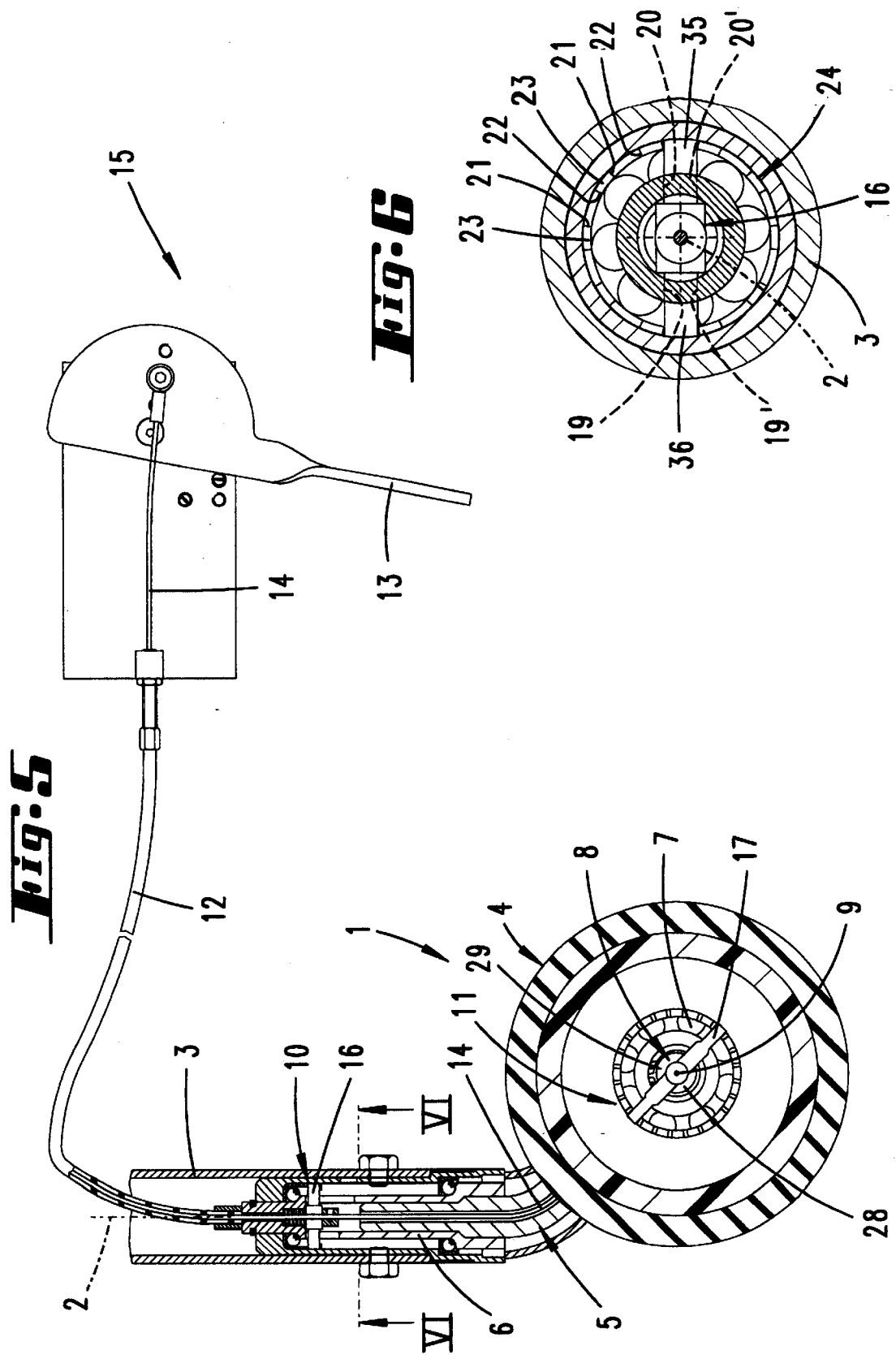

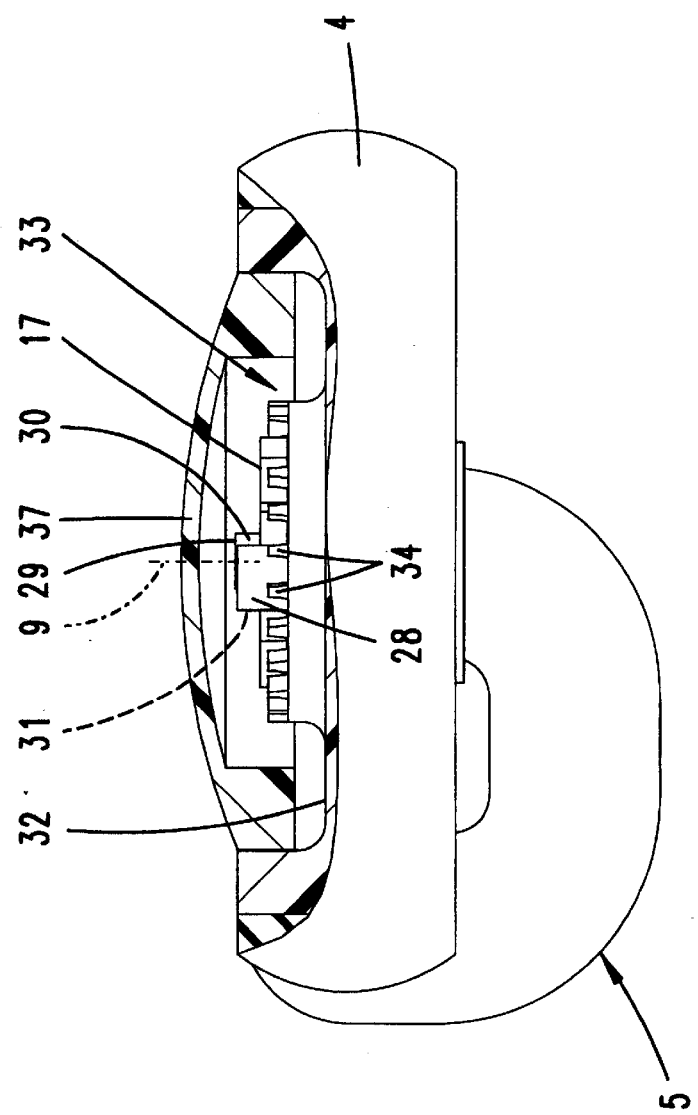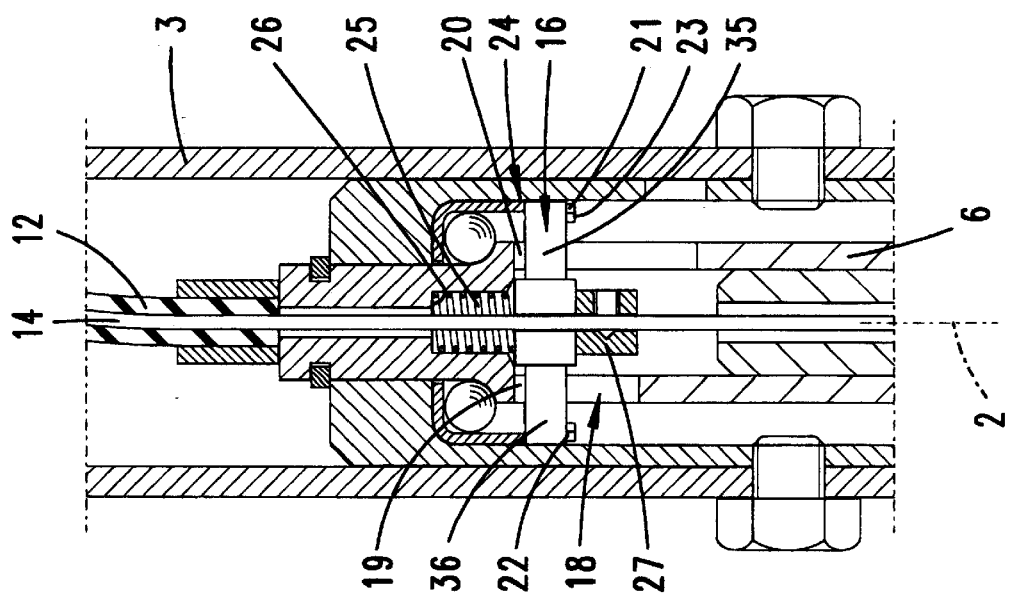

CASTER WITH SECURING DEVICE

FIELD AND BACKGROUND OF THE INVENTION

The invention relates to a caster, in particular for movable hospital beds, laboratory tables and the like, with a securing device which is connected to a handle via a Bowden cable.

Running or steering casters arranged on movable hospital beds, laboratory tables and the like are often secured by means of linkage-actuated brake blocks. DE 44 27 320 A1 discloses a securing device, in which a securing foot, axially displaceable within a tubular strut, can be extended in such a way that the casters lift off from the ground and, consequently, movable hospital beds, laboratory tables and the like are secured reliably. The axial displacement of the securing foot is carried out by transmitting the force, generated by means of a handle, via a Bowden cable. A feature common to both of these solutions is that a multiplicity of exposed and cooperating components, such as a brake linkage or the securing foot, are easily susceptible to contamination or considerable problems in disinfecting them arise.

SUMMARY OF THE INVENTION

It is an object of the invention to develop a caster further, in such a way that, in addition to the movable hospital bed, laboratory table or the like being secured reliably, said caster meets hygienic requirements which exceed the customary standard.

According to the invention, with the aim being that a locking piece is movable by means of the Bowden cable between a locking and an unlocking position, in the locking position, the locking piece, being located between pairs of stop faces which are fixed relative to a rotary part and are fixed on the rotary part and which are designed in relation to an axis of rotation, blocks rotational movement about the axis of rotation, and in the unlocking position, the locking piece releases at least identically fixed pairs of the stop faces for rotational movement of the rotary part. By means of the securing device according to the invention, in the first place, a running caster can be secured reliably in terms of its rotational movement. However, the securing device according to the invention also serves for securing a steering caster in terms of rotational movement about, for example, its axis of rotation parallel to the strut, namely a vertical axis. In addition to the special possibilities for using it, the securing device according to the invention affords further advantages. In the first place, only one locking piece is moved between a locking and an unlocking position by means of the Bowden cable. As a result, the actuating force required or the force to be transmitted by the Bowden cable is reduced considerably, as compared with DE 44 27 320, since, there, the entire table weight is carried via the Bowden cables. In the invention, in the locking position, the locking piece is introduced essentially positively between stop faces fixed on the rotary part and fixed relative to this rotary part, with the result that rotational movement of the rotary part about an axis of rotation is blocked. For this purpose, for example, the stop faces are arranged so as to extend essentially axially and radially in relation to the axis of rotation. At least one pair of such stop faces is to be provided on the rotary part. Likewise, a component which is fixed relative to the rotary part also has such a pair of stop faces. Such a fixed component may itself, in turn, constitute a rotary part in relation to a further component, for example a strut. In the unlocking position, the locking piece located between the at least two pairs of stop faces, when it is actuated by means of the Bowden cable, then releases the at least one pair of identically fixed stop faces for rotational movement of the rotary part, specifically either the stop faces of the rotary part or the stop faces which are fixed relative to the rotary part. If appropriate, the locking piece may also release all the stop faces. For this purpose, there may be provision for the locking piece to be mounted tiltably about an axis between one pair of stop faces and to be rotated about this tilt axis by means of the Bowden cable, until the stop faces of the other pair are released. Preferably, however, the locking piece is axially displaceable on the axis of rotation, and it is further preferred that the locking piece be axially displaceable between stop faces. As a result, complex cinematics are avoided and locking and unlocking are executed by linear displacement of the locking piece by means of the Bowden cable. The securing device according to the invention thus not only acts directly on the caster wheel, but locks an axis of the rotary part by means of its bearing receiving the latter. Consequently, the radial dimensions of the securing device as a whole can be kept small. The axial extent of the stop faces is also uncritical, since, in the securing device according to the invention, securing takes place positively, in contrast to known frictional methods of securing the, for example, caster wheel. It is therefore possible to encase the securing device completely, for example within the strut or within the caster wheel, and thus design said securing device to meet the most stringent hygiene requirements. A further advantage is the guidance of the locking piece between stop faces. Tipping or maladjustment of the locking piece is therefore ruled out. Such guiding stop faces may, in particular, be formed, so as to be fixed on the rotary part, by side faces of a long hole. A barlike locking piece can pass through this long hole, said locking piece having a radial projection which is of round or slightly wedgelike cross section, a cross-sectional taper then being directed toward the free space between the other pair of stop faces. This ensures easy engagement during the transition into the locking position. These other pairs of stop faces are then preferably formed by flanks of teeth of a toothed ring arranged concentrically to the axis of rotation. Securing can then take place in a multiplicity of positions of the rotary part, depending on the pitch of said toothed ring. Should the locking piece nevertheless strike a tooth during the securing operation, securing can still be achieved by the rotary part being slightly displaced with ease. Locking is carried out by means of a pull applied to the Bowden cable by means of the handle counter to the force of a spring. By virtue of this measure, the Bowden cable is, in general, loaded only by tensile forces. Consequently, the core of the Bowden cable can be made comparatively flexible and the handle can therefore be attached at virtually any desired location on the movable hospital bed, laboratory table or the like. In this case, it is further preferred to design the spring as a compression spring which is supported between a locking piece and a shoulder axially immovable relative to the Bowden cable. A special abutment for the spring on the Bowden cable is thereby avoided, since the locking piece has to be fixed to the latter at the factory. In a further embodiment of the invention, it is provided that a rocker carrying the caster wheel is mounted rotatably about a vertical axis by means of an insertion part in an essentially tubular strut, that a barlike locking piece fixed to the Bowden cable is axially displaceable in a long hole passing through the insertion part and projects radially from the insertion part, that an axially projecting toothed ring is designed coaxially to the vertical axis, so as to be fixed on the strut, and that, in the locking position, the portions of the locking piece which project radially from the insertion part, said portions being located between pairs of teeth of the toothed ring, block rotational movement about the vertical axis. In a steering caster of this type, therefore, in the locking position, a steering movement, that is to say rotation of the caster about the vertical axis, is ruled out. In a further embodiment, the invention provides a unilateral rocker mounting of the caster wheel on a fixed wheel shaft, through which the Bowden cable terminating in a locking piece passes, that side of the caster wheel which faces away from the rocker having an axially projecting toothed ring designed concentrically to the axis of rotation of the caster wheel, and that, in the locking position, the locking piece, being located between pairs of teeth fixed on the caster wheel and stop faces fixed on the wheel shaft, blocks the rotational movement of the wheel. As a result, rotational movement of the wheel of, for example, a running caster is blocked reliably and in this case, in conjunction with the preceding feature, in particular with regard to a steering caster, both movement about the vertical axis and movement about the axis of rotation of the wheel can be reliably ruled out. For this purpose, there may be provision, further, for the Bowden cable to pass through a first locking piece and to terminate in a second locking piece, the first locking piece being designed for locking rotational movement of the caster about a vertical axis and the second locking piece being designed for locking rotational movement of the caster wheel about a horizontal axis of rotation. Finally, there may be provision for that side of the caster wheel which faces away from the rocker to have a wheel cap covering the securing device. It is perfectly possible to carry out maintenance work, for example to draw in a new Bowden cable after the removal of the wheel cap. On the other hand, the securing device is closed off from the surroundings by the wheel cap.

BRIEF DESCRIPTION OF THE DRAWINGS

The invention is explained in more detail with reference to the drawings which illustrate only one exemplary embodiment and in which FIG. 1 shows a section through a steering caster according to the invention articulated in a tubular strut, FIG. 2 shows a section along the line II—II in FIG. 1, FIG. 3 shows an enlarged illustration of the securing device according to FIG. 1 blocking rotational movement about a vertical axis, FIG. 4, shows a partially cut away bottom view of a securing device for the caster wheel, FIG. 5 shows the device according to FIG. 1 in the securing position, FIG. 6 shows a section along the line VI—VI in FIG. 5, FIG. 7 shows a section according to FIG. 3 through the locking piece in the locking position, and FIG. 8 shows a view according to FIG. 4 of the locking piece in the locking position.

DETAILED DESCRIPTION OF THE PREFERRED EMBODIMENT

The exemplary embodiment illustrated in the drawing relates to a steering caster 1 which is mounted rotatably about a vertical axis 2 in a strut 3 of, for example, a hospital bed. For this purpose, a rocker 5 carrying the caster wheel 4 has an insertion part 6 inserted into the strut 3 and mounted on ball bearings there. The caster wheel 4 is connected rotatably about a horizontal axis of rotation 9 to a fixed wheel shaft 8 via a ball bearing 7.

The rotational movements both about the vertical axis 2 and about the horizontal axis of rotation 9 can be prevented by means of the securing devices 10 and 11 respectively. The two securing devices 10, 11 are actuated simultaneously by means of a Bowden cable 12, in that the core 14 of the Bowden cable 12 is displaced via a hand lever 13 articulated at a fixed location on the frame.

The handle 15 together with the hand lever 13 may also be designed, for example, in the manner of a bicycle brake or of a toggle lever. It is expedient here, however, to fix the core in relation to the Bowden cable in the locking and unlocking positions of the locking pieces 16, 17 of the securing device 10, 11.

The securing device 10 is first explained in more detail with reference to FIGS. 2 and 3 and the corresponding FIGS. 6 and 7. By means of the core 14 of the Bowden cable 12, the locking piece 16 can be moved out of the unlocking position shown in FIG. 3 into the locking position according to FIG. 7. This displacement takes place axially on the vertical axis 2 which is the axis of rotation for the rocker 5. Formed so as to be fixed on the rotary part, specifically, here, so as to pass through the insertion part 6, is a long hole 18, the essentially axially and radially extending side walls of which are designed as stop faces 19, 20 and, together with the opposite side faces 19', 20' of the long hole 18 which are not illustrated, in pairs surround and guide the locking piece 16. The forces in the circumferential direction are consequently not absorbed by the core 14, but are transmitted to the insertion part 6.

Corresponding pairs of stop faces 21, 22 are designed, so as to be fixed on the strut, that is to say fixed as a rotary part relative to the insertion part 6, by the flanks of teeth 23 of a toothed ring 24 arranged concentrically to the vertical axis 2, see also FIGS. 2 and 6.

In the unlocking position according to FIGS. 1 to 3, the locking piece 16 is kept free of the toothed ring 24 by means of the force of a compression spring 25, that is to say the pairs of stop faces 21, 22, which are designed to be fixed as a rotary part relative to the insertion part 6, are released by means of the locking piece 16 for rotational movement of the insertion part 6 about the vertical axis 2.

When the hand lever 13 is transferred into the position shown in FIG. 5, a pull is consequently exerted on the core 14 of the Bowden cable 12 counter to the force of the spring 25. For this purpose, the spring 25 is supported on a shoulder 26 of the insertion part 6, said shoulder being immovable in relation to the Bowden cable. The compression spring 25 is in abutment on the locking piece 16 itself, through which the core 14 passes and which is fixed to the core 14 by means of a screw-on clamp 27.

The rocker 5 carrying the caster wheel 4 is secured in terms of rotational movement about the vertical axis 2 by means of the axial displacement of the barlike locking piece 16, guided in the long hole 18, into the position shown in FIGS. 5 to 7. In the locking position shown, portions 35, 36 of the locking piece 16 which project radially from the insertion part 6 are located between opposite pairs 21, 22 of stop faces which are designed so as to be fixed on the strut and therefore so as to be fixed as a rotary part relative to the insertion part 6. Blockage preventing rotational movement about the axis of rotation 2 thereby takes place in specific rotary positions of the insertion part 6.

Various alternatives are also possible as regards the design of the locking piece 16 and of the toothed ring 24. Thus, it is conceivable for the locking piece also to have a starlike or cruciform design. What is essential is the design of mutually opposite pairs of stop faces which are fixed on the rotary part and are fixed relative to this rotary part and, in each case, are located opposite one another and which are prevented via the intermediate locking piece from executing a rotational movement relative to one another.

In order to secure the caster wheel 4 in terms of rotational movement, the securing device 11 is provided. The securing device 11 is likewise actuated by means of the core 14 of the Bowden cable 12, said core passing through the first locking piece 16 and terminating in the second locking piece 17. The core 14 of the Bowden cable 12 is laid within the rocker 5, on which the caster wheel 4 is unilaterally mounted via the ball bearing 7 on the fixed wheel shaft 8. Stop faces 30, 31, which guide the locking piece 17 axially relative to the horizontal axis of rotation 9, are formed, by means of guide bosses 28, 29, on the wheel shaft 8 which is fixed relative to the caster wheel 4.

The side 32 facing away from the rocker is provided with an axially projecting toothed ring 33 designed concentrically to the axis of rotation 9 of the caster wheel 4. In the locking position according to FIG. 8, the locking piece 17 penetrates with its two free ends between pairs of teeth 34 fixed on the caster wheel and blocks rotational movement of the wheel 4 in a way corresponding to the securing device 10.

The securing device 11 is arranged essentially within the wheel circumference and is covered by a wheel cap 37. Neither the securing device 10 nor the securing device 11 therefore has exposed, outer movable parts. Instead, the two securing devices 10, 11 are encased, thus ensuring that these have an exceedingly hygienic design. Impairment of functioning is likewise virtually ruled out as a result. Cleaning or disinfection can be carried out virtually without any impairment of the securing function.

When the hand lever 13 is transferred out of the position shown in FIG. 5 into that according to FIG. 1, the securing device 10 or 11 is consequently released again. The compression spring 25 subjects the core 14 of the Bowden cable 12 to a pull, so that a malfunction is essentially ruled out. If the core 14 cannot be subjected to a push so as also to release the securing device 11, it is possible, for example, to arrange a further compression spring there. Likewise, it is also possible to have, precisely there at the end of the Bowden cable, a tension spring which, for example, could be suspended between the locking piece 17 and the wheel cap 34.

What is claimed is:

1. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), respectively, said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein the Bowden cable (12) passes through a first said locking piece (16) and has a second locking piece (17), the first locking piece (16) being for locking rotational movement of the caster (1) about a vertical axis (2) and the second locking piece (17) being for locking rotational movement of a caster wheel (4) about a horizontal axis of rotation (9).

2. The caster as claimed in claim 1, wherein the locking piece (16) is axially displaceable on the axis of rotation (2).

3. The caster as claimed in claim 1, wherein the locking piece is guided displaceably between said stop faces (19, 19', 20, 20').

4. The caster as claimed in claim 1, wherein the stop faces (19, 19', 20, 20') are formed by side faces of an elongated hole (18).

5. The caster as claimed in claim 1, wherein the stop faces (21, 22) are formed by flanks of teeth (23) of a toothed ring (24) arranged concentrically to the axis of rotation (2).

6. The caster as claimed in claim 1, wherein locking is carried out a pull applied to the Bowden cable (12) by a handle (15) counter to force of a spring (25).

7. The caster as claimed in claim 6, wherein the spring is a compression spring (25) which is supported between said locking piece (16) and a shoulder (26) immovable relative to the Bowden cable (12).

8. The caster as claimed in claim 1, wherein a rocker (5) carrying the caster wheel (4) is mounted rotatably about said vertical axis (2) by an insertion part (6) in an essentially tubular strut (3), said insertion part (6) constituting said rotary part (6), wherein a barlike said locking piece (16) fixed to the Bowden cable (12) is axially displaceable in an elongated hole (18) passing through the insertion part (6) and projects radially from the insertion part (6), wherein an axially projecting toothed ring (24) is coaxial to the vertical axis (2), fixed on the strut, and wherein, in the locking position, portions (35, 36) of the locking piece (16) which project radially from the insertion part (6), being located between pairs of teeth (23, 23) of the toothed ring (24), block rotational movement about the vertical axis (2).

9. The caster as claimed in claim 1, wherein there is a unilateral mounting of the caster wheel (4) on a fixed wheel shaft (8), through which the Bowden cable (12) passes terminating in said second locking piece (17), wherein a side (32) of the caster wheel (4) which faces away from a rocker of the caster has an axially projecting toothed ring (33) coaxially to the axis of rotation (9) of the caster wheel (4), and wherein, in the locking position, the second locking piece (17), being located between pairs of teeth (34, 34) fixed on the caster wheel and additional stop faces (30, 31) fixed on the wheel shaft, blocks rotational movement to the wheel (4).

10. The caster wheel as claimed in claim 1, wherein a side (32) of the caster wheel (4) which faces away from a rocker of the caster has a wheel cap (37) covering securing device (11) comprising said second locking piece.

11. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein the locking piece (16) is axially displaceable on the axis of rotation (2).

12. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein the stop faces (19, 19', 20, 20') are formed by side faces of an elongated hole (18).

13. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein the stop faces (21, 22) are formed by flanks of teeth (23) of a toothed ring (24) arranged concentrically to the axis of rotation (2).

14. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein a rocker (5) carrying a caster wheel (4) of the caster is mounted rotatably about a vertical axis (2) by an insertion part (6) in an essentially tubular strut (3), said insertion part (6) constituting said rotary part (6), wherein a barlike said locking piece (16) fixed to the Bowden cable (12) is axially displaceable in an elongated hole (18) passing through the insertion part (6) and projects radially from the insertion part (6), wherein an axially projecting toothed ring (24) is coaxial to the vertical axis (2), fixed on the strut, and wherein, in the locking position, portions (35, 36) of the locking piece (16) which project radially from the insertion part (6), being located between pairs of teeth (23, 23) of the toothed ring (24), block rotational movement about the vertical axis (2).

15. A caster, with a securing device which is connected to a handle via a Bowden cable, wherein a locking piece (16) is movable between a locking position and an unlocking position by means of the Bowden cable (12), wherein, in the locking position, the locking piece (16) being located between pairs of stop faces (21, 22; 19, 19', 20, 20'), said stop faces being fixed relative to a rotary part (6) and being fixed on the rotary part with respect to an axis of rotation (2), said locking piece (16) blocks rotational movement about the axis of rotation (2), and wherein, in the unlocking position, the locking piece (16) releases at least alike fixed pairs of said stop faces (21, 22) for rotational movement of the rotary part (6), wherein there is a unilateral mounting of a caster wheel (4) on a fixed wheel shaft (8), through which the Bowden cable (12) passes terminating in a second locking piece (17), wherein a side (32) of the caster wheel (4) which faces away from a rocker of the caster has an axially projecting toothed ring (33) coaxially to an axis of rotation (9) of the caster wheel (4), and wherein, in the locking position, the second locking piece (17), being located between pairs of teeth (34, 34) fixed on the caster wheel and additional stop faces (30, 31) fixed on the wheel shaft, blocks rotational movement to the wheel (4).

* * * * *